UNITED STATES PATENT OFFICE.

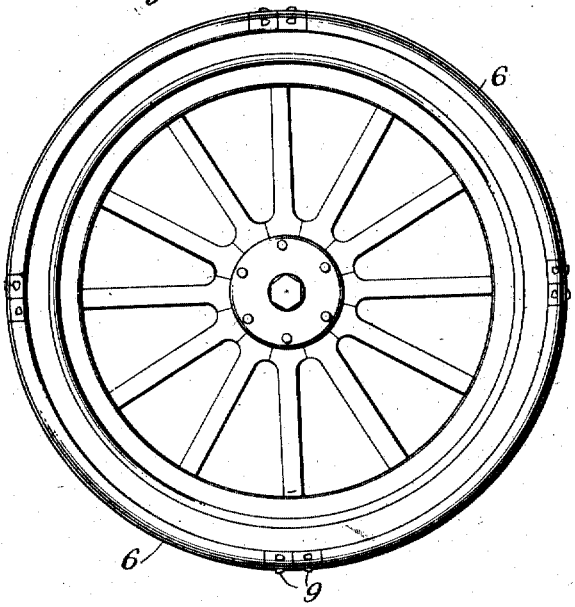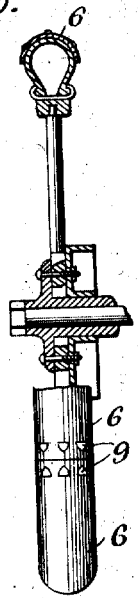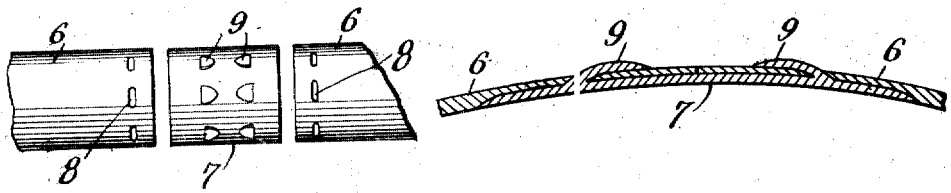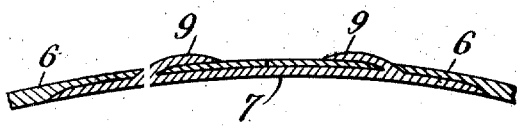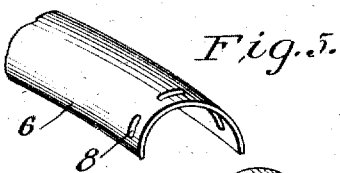

ANDREW T. LANEY, OF CLINTON, MISSOURI.

TIRE-PROTECTOR.

1,216,141.  Specification of Letters Patent.  Patented Feb. 13, 1917.

Application filed September 24, 1915. Serial No. 52,517.

*To all whom it may concern:*

Be it known that I, ANDREW T. LANEY, a citizen of the United States, residing at Clinton, in the county of Henry and State of Missouri, have invented certain new and useful Improvements in Tire-Protectors, of which the following is a specification, reference being had therein to the accompanying drawing.

It is an object of the invention to provide a covering for pneumatic, solid-rubber, and other resilient tires that will protect them from wear and puncture, and more particularly the invention contemplates the provision of a protector that includes a plurality of arcuate metallic covering sections so formed and arranged that they may be easily placed to completely surround and cover the periphery of a tire and be as easily removed therefrom when desired.

When read in connection with the description herein, the details and formation of the article will be apparent from the accompanying drawing, forming part hereof, wherein one embodiment of the invention is disclosed, for purposes of illustration.

Like reference-characters refer to corresponding parts in the views of the drawing, of which—

Figure 1 is a side view of the protector applied to a wheel-tire;

Fig. 2 is a plan view of abutting ends of two sections and a coupling therefor, the parts being shown disconnected;

Fig. 3 is a view, partly in elevation and partly in diametrical section, showing a protector on a wheel-tire;

Fig. 4 is a sectional view on a peripheral line through the coupled end portions of two sections; and Fig. 5 is a perspective view of an end portion of a section and a coupling.

Having more particular reference to the drawing, 6 designates arcuate segments or sections, and 7 designates couplings, which latter are overlapped by meeting end portions of the sections and which hold the sections together. The sections are of a sufficient number to extend entirely around the periphery of a tire when coupled together.

For the purpose of maintaining the sections together to form a complete protector, each section has near each end a series of transversely-disposed slots or openings 8 and each coupling has two series of the same number of similarly-disposed hooks or tongues 9 arranged to engage into the slots or openings 8. The slots or openings and hooks or tongues are so relatively arranged that, when sections are coupled together, the ends of the sections will be in abutment and an uninterrupted wearing surface presented.

The sections and couplings are made of sheet metal of sufficient thickness and tenacity to withstand wear and to be proof against puncture by articles ordinarily encountered on a street or road that are apt to puncture unprotected resilient tires. They are curved to conform to the periphery of the tire on which they are to be used, and they are shaped to cover the tread and a portion of the sides of the tire, so that when the sections are connected the entire protector conforms in all respects to the contour of the tire.

If desired, each section may have its end portions reduced in thickness where it overlaps a coupling, the reduction being sufficient to accommodate the coupling, which then is of less thickness than the intermediate portion of a section, so that at the places the sections overlap the couplings the protector is of substantially the same thickness as at other places, as seen in Fig. 4, and raised places at the joints thereby are avoided.

When the protector is to be placed on a pneumatic tire, the sections preferably are assembled and connected around the tire when in a deflated condition. The hooks or tongues 9, which preferably are pointed to facilitate insertion through the slots or openings 8, are passed through those openings of the sections. Each series of hooks or tongues of a coupling extend away from the end and toward the other series thereof, so as to sustain the oppositely-exerted pull of the sections connected by the coupling, and after insertion through the openings they may be hammered down, if desired, to make them lie close against and conform to the contour of the protector. After the sections are connected on a deflated tire, the tire is inflated and thereby caused to fill the concave inner portion of the protector and to pull the sections taut on the couplings, and thus the protector is held tight on the tire and its parts prevented from displacement therefrom. The protector may be removed by a reversal of this operation.

Having thus described my invention, what

I claim as new, and desire to secure by Letters Patent, is—

A tire-protector comprising a plurality of arcuate sections shaped to conform to and to cover the tread and a portion of the sides of a tire, and couplings lapped by and joining the abutting portions of the sections, each section having near each end a series of transversely-disposed openings and each coupling having adjacent to each of its ends a series of similarly-disposed hooks arranged to engage through said openings, the hooks of each series extending away from the adjacent end of the coupling and in a direction opposite to pull of a section thereon, and both sections where lapping a coupling being of reduced thickness on the inside.

Clinton, Missouri, July 23rd, 1915.

ANDREW T. LANEY.